US012676333B2

(12) United States Patent
Jung et al.

(10) Patent No.: US 12,676,333 B2
(45) Date of Patent: Jul. 7, 2026

(54) ELECTRODE ASSEMBLY AND SECONDARY BATTERY COMPRISING THE SAME

(71) Applicant: SAMSUNG SDI CO., LTD., Yongin-si (KR)

(72) Inventors: Hyun Ki Jung, Yongin-si (KR); In Young Jang, Yongin-si (KR); Nobuyuki Oyagi, Yongin-si (KR); Sung Soo Park, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 482 days.

(21) Appl. No.: 17/792,486

(22) PCT Filed: Feb. 3, 2021

(86) PCT No.: PCT/KR2021/001416
§ 371 (c)(1),
(2) Date: Jul. 13, 2022

(87) PCT Pub. No.: WO2021/162330
PCT Pub. Date: Aug. 19, 2021

(65) Prior Publication Data
US 2023/0059201 A1 Feb. 23, 2023

(30) Foreign Application Priority Data
Feb. 14, 2020 (KR) ........................ 10-2020-0018292

(51) Int. Cl.
*H01M 10/04* (2006.01)
*H01M 4/04* (2006.01)
(Continued)

(52) U.S. Cl.
CPC ..... *H01M 10/0431* (2013.01); *H01M 4/0404* (2013.01); *H01M 10/0422* (2013.01); *H01M 50/186* (2021.01); *H01M 50/46* (2021.01)

(58) Field of Classification Search
CPC ................................................ H01M 10/0431
See application file for complete search history.

(56) References Cited

U.S. PATENT DOCUMENTS 8,535,822 B2 9/2013 Cha et al.
2008/0241687 A1* 10/2008 Ishii ........................ B60L 50/20
429/246
(Continued)

FOREIGN PATENT DOCUMENTS

CN 101276942 A 10/2008
JP H11 135101 A 5/1999
(Continued)

OTHER PUBLICATIONS

JP2006252879A Machine Translation (Year: 2006).*
(Continued)

*Primary Examiner* — Brian R Ohara
*Assistant Examiner* — M. T. Leonard
(74) *Attorney, Agent, or Firm* — Lee IP Law, P.C.

(57) ABSTRACT

An electrode assembly includes an anode plate having an anode coating layer formed on an anode current collector plate; a cathode plate having a cathode coating layer formed on a cathode current collector plate; and a separator interposed between the cathode plate and the anode plate, the electrode assembly being formed by winding a stack of the anode plate, the separator, and the cathode plate, the cathode plate having: a side extending along the lengthwise direction; a side opposite to the side, extending along the lengthwise direction; and a leading side connecting the side and the opposite side and located at a center winding portion of the wound electrode assembly, the leading side being slanted to have an acute angle or obtuse angle with respect to the side; and a terminating side connecting the side and the opposite side and located, as a side opposite to the leading side.

9 Claims, 7 Drawing Sheets

(51) Int. Cl.
    *H01M 50/186*        (2021.01)
    *H01M 50/46*         (2021.01)

(56)                    References Cited

U.S. PATENT DOCUMENTS

| | | | |
|---|---|---|---|
| 2010/0143773 A1 | 6/2010 | Honbou | |
| 2011/0033737 A1 | 2/2011 | Miyahisa et al. | |
| 2014/0302366 A1* | 10/2014 | Sugita ..................... | H01M 4/70 |
| | | | 429/94 |
| 2021/0005936 A1 | 1/2021 | Jeong | |

FOREIGN PATENT DOCUMENTS

| | | | |
|---|---|---|---|
| JP | 2004-296159 | A | 10/2004 |
| JP | 2006-252879 | A | 9/2006 |
| JP | 2009-245771 | A | 10/2009 |
| JP | 2010-186740 | A | 8/2010 |
| JP | 2010287513 | A * | 12/2010 |
| JP | 2016-219382 | A | 12/2016 |
| JP | 2018-85205 | A | 5/2018 |
| JP | 2019-016423 | A | 1/2019 |
| KR | 20-1998-0011901 | U | 5/1998 |
| KR | 10-2006-0022128 | A | 3/2006 |
| KR | 10-1002487 | B | 12/2010 |
| KR | 10-2019-0098495 | A | 8/2019 |

OTHER PUBLICATIONS

JP2010287513A Machine Translation (Year: 2010).*
KR20090132802A Machine Translation (Year: 2009).*
JPH11135101A machine translation (Year: 2025).*
International Search Report dated May 28, 2021 for PCT/KR2021/001416.
Chinese Office action dated Mar. 15, 2025.
European Search Report dated Dec. 13, 2024, of the European Patent Application No. 21754377.6.

* cited by examiner

120

ELECTRODE ASSEMBLY AND SECONDARY BATTERY COMPRISING THE SAME

CROSS REFERENCE TO RELATED APPLICATIONS

This is the U.S. national phase application based on PCT Application No. PCT/KR2021/001416, filed Feb. 3, 2021, which is based on Korean Patent Application No. 10-2020-0018292, filed Feb. 14, 2020, the entire contents of all of which are hereby incorporated by reference.

TECHNICAL FIELD

Various embodiments of the present invention relate to an electrode assembly and a secondary battery comprising same.

BACKGROUND ART

A secondary battery is a power storage system that provides excellent energy density for storing electrical energy in the form of chemical energy. Compared to non-rechargeable primary batteries, secondary batteries are rechargeable and are widely used in IT devices such as smartphones, cellular phones, laptops, and tablet PCs. Recently, in order to prevent environmental pollution, interest in electric vehicles has increased, and high-capacity secondary batteries are being adopted for electric vehicles accordingly. Such secondary batteries are required to have characteristics such as high density, high output, and stability.

The above information disclosed in this Background section is only for enhancement of understanding of the background of the invention and therefore it may contain information that does not constitute prior art.

DESCRIPTION OF EMBODIMENTS

Technical Problem

The present invention provides an electrode assembly capable of preventing short due to distortion, and a secondary battery comprising same, since the stress exerted by distortion occurring during charging and discharging of a secondary battery can be distributed by a slanted leading side of an anode plate.

Solution to Problem

In an electrode assembly and a secondary battery comprising same, according to an embodiment of the present invention, the electrode assembly comprising: an anode plate having an anode coating layer formed on an anode current collector plate; a cathode plate having a cathode coating layer formed on a cathode current collector plate; and a separator interposed between the cathode plate and the anode plate, the electrode assembly being formed by winding a stack of the anode plate, the separator, and the cathode plate, wherein the cathode plate comprises: a side extending along the lengthwise direction; a side opposite to the side, extending along the lengthwise direction; and a leading side connecting the side and the opposite side and located at a center winding portion of the wound electrode assembly, the leading side being slanted to have an acute angle or obtuse angle with respect to the side; and a terminating side connecting the side and the opposite side and located, as a side opposite to the leading side, on the outermost side of the electrode assembly.

The leading side may be located in a leading-end region, the cathode plate may be a right-angled triangle in the leading-end region, and the leading side may be an oblique side of the right-angled triangle.

The leading-end region may be wound by any one of ¼ to 1 turn when the electrode assembly is wound in a cylindrical shape.

The terminating side may be parallel to the leading side, and thus the cathode plate may be a parallelogram plate.

The anode plate is a rectangular plate and may have a side and an opposite side of the side, extending along the lengthwise direction and parallel to the side of the cathode plate, a leading side connecting the side of the anode plate and the opposite side of the anode plate and located at the center winding portion of the wound electrode assembly, and a terminating side connecting the side of the anode plate and the opposite side of the anode plate and located, as a side opposite to the leading side of the anode plate, on the outermost side of the wound electrode assembly.

The leading side of the anode plate may extend longer toward the center winding portion along the longitudinal direction than to the leading side of the cathode plate.

The leading side of the cathode plate may include a first leading side slanted to have an acute angle from the side, and a second leading side slanted to have an acute angle from the opposite side and connected to an end of the first leading side, and may have a bent portion at a portion where the first leading side and the second leading side are connected.

The leading side of the cathode plate may include a first leading side slanted to have an acute angle from the side, and a second leading side slanted to have an obtuse angle from the opposite side and connected to an end of the first leading side, and may have a bent portion at a portion where the first leading side and the second leading side are connected.

The bent portion may be located at the center of the leading side.

The terminating side of the cathode plate may be shaped to correspond to the leading side.

In addition, an electrode assembly and a secondary battery comprising same, according to an embodiment of the present invention, may include an electrode assembly, a case having an internal space, wherein the electrode assembly accommodates an electrolyte in the inner space, and a cap plate that is coupled to an upper portion of the case to seal the case.

Advantageous Effects of Disclosure

In an electrode assembly and a secondary battery comprising same, according to an embodiment of the present invention, the leading side of the cathode plate is formed to be slanted, so that stress exerted by distortion occurring at a center winding portion during charging and discharging of a secondary battery can be distributed, thus preventing the cathode plate from penetrating a separator at the distorted site causing a short with an anode plate.

BEST MODE

Figure 1A:
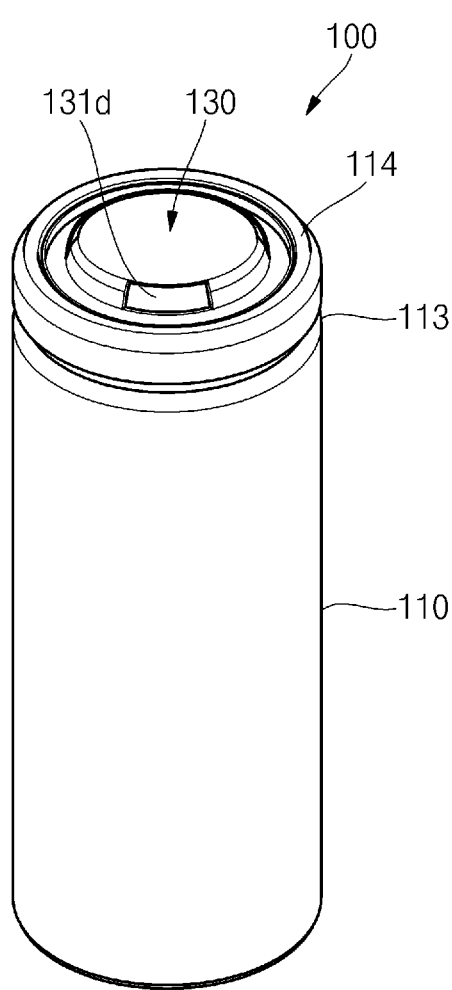
FIGS. 1A, 1B, and 1C are a perspective view, an exploded perspective view, and a longitudinal cross-sectional view illustrating a secondary battery according to an embodiment of the present invention.

Hereinafter, preferred embodiments of the present invention will be described in detail with reference to the accompanying drawings.

Examples of the present invention are provided to more completely explain the present invention to those skilled in the art, and the following examples may be modified in various other forms. The present invention, however, may be embodied in many different forms and should not be construed as being limited to the example (or exemplary) embodiments set forth herein. Rather, these example embodiments are provided so that this disclosure will be thorough and complete and will convey the aspects and features of the present invention to those skilled in the art.

In addition, in the accompanying drawings, sizes or thicknesses of various components are exaggerated for brevity and clarity. Like numbers refer to like elements throughout. As used herein, the term "and/or" includes any and all combinations of one or more of the associated listed items. In addition, it will be understood that when an element A is referred to as being "connected to" an element B, the element A can be directly connected to the element B or an intervening element C may be present therebetween such that the element A and the element B are indirectly connected to each other.

The terminology used herein is for the purpose of describing particular embodiments only and is not intended to be limiting of the disclosure. As used herein, the singular forms are intended to include the plural forms as well, unless the context clearly indicates otherwise. It will be further understood that the terms that the terms "comprise" and/or "comprising," when used in this specification, specify the presence of stated features, numbers, steps, operations, elements, and/or components, but do not preclude the presence or addition of one or more other features, numbers, steps, operations, elements, components, and/or groups thereof.

It will be understood that, although the terms first, second, etc. may be used herein to describe various members, elements, regions, layers and/or sections, these members, elements, regions, layers and/or sections should not be limited by these terms. These terms are only used to distinguish one member, element, region, layer and/or section from another. Thus, for example, a first member, a first element, a first region, a first layer and/or a first section discussed below could be termed a second member, a second element, a second region, a second layer and/or a second section without departing from the teachings of the present invention.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the element or feature in the figures is turned over, elements described as "below" or "beneath" other elements or features would then be oriented "on" or "above" the other elements or features. Thus, the exemplary term "below" can encompass both an orientation of above and below.

Figure 1B:
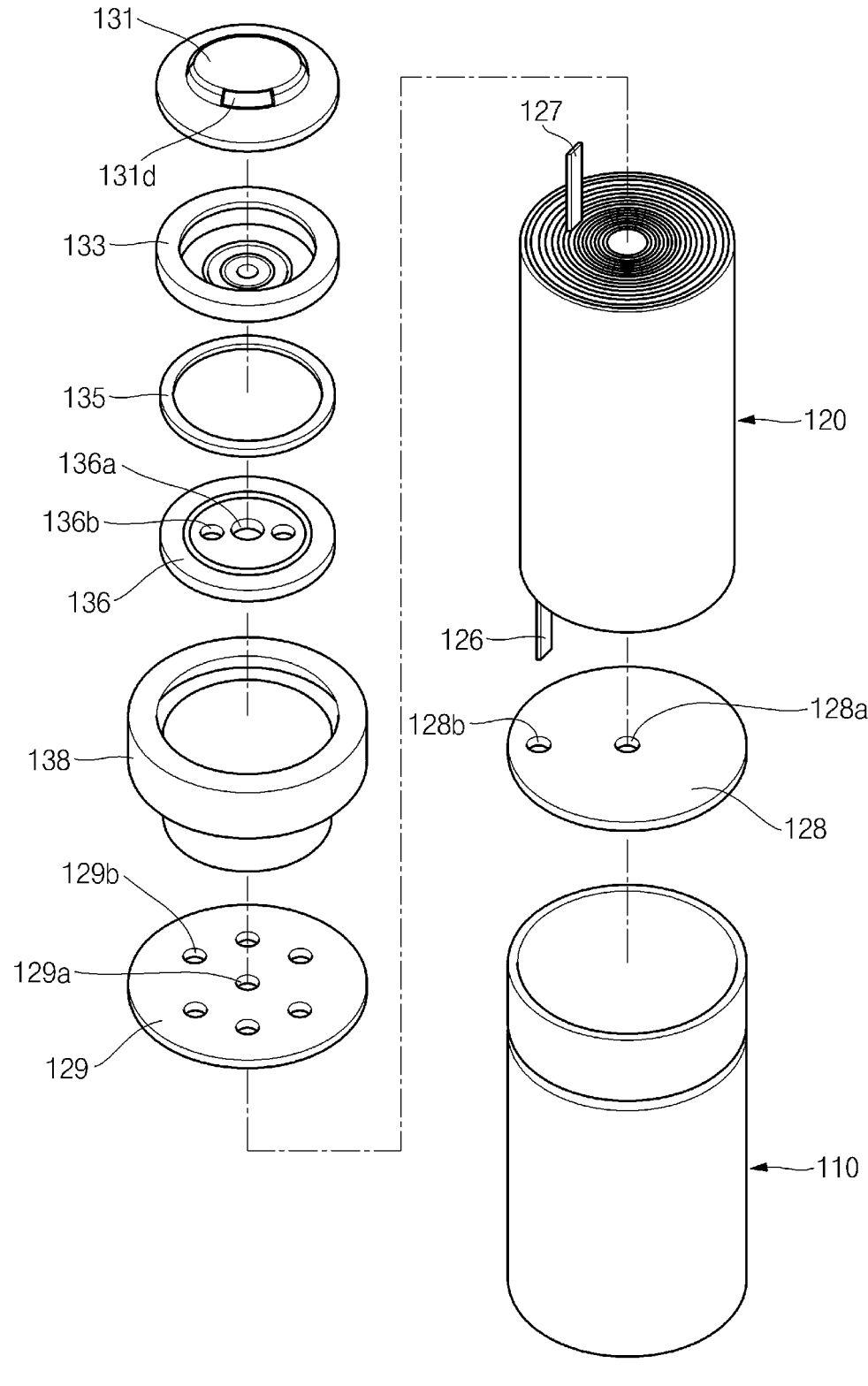
Figure 1C:
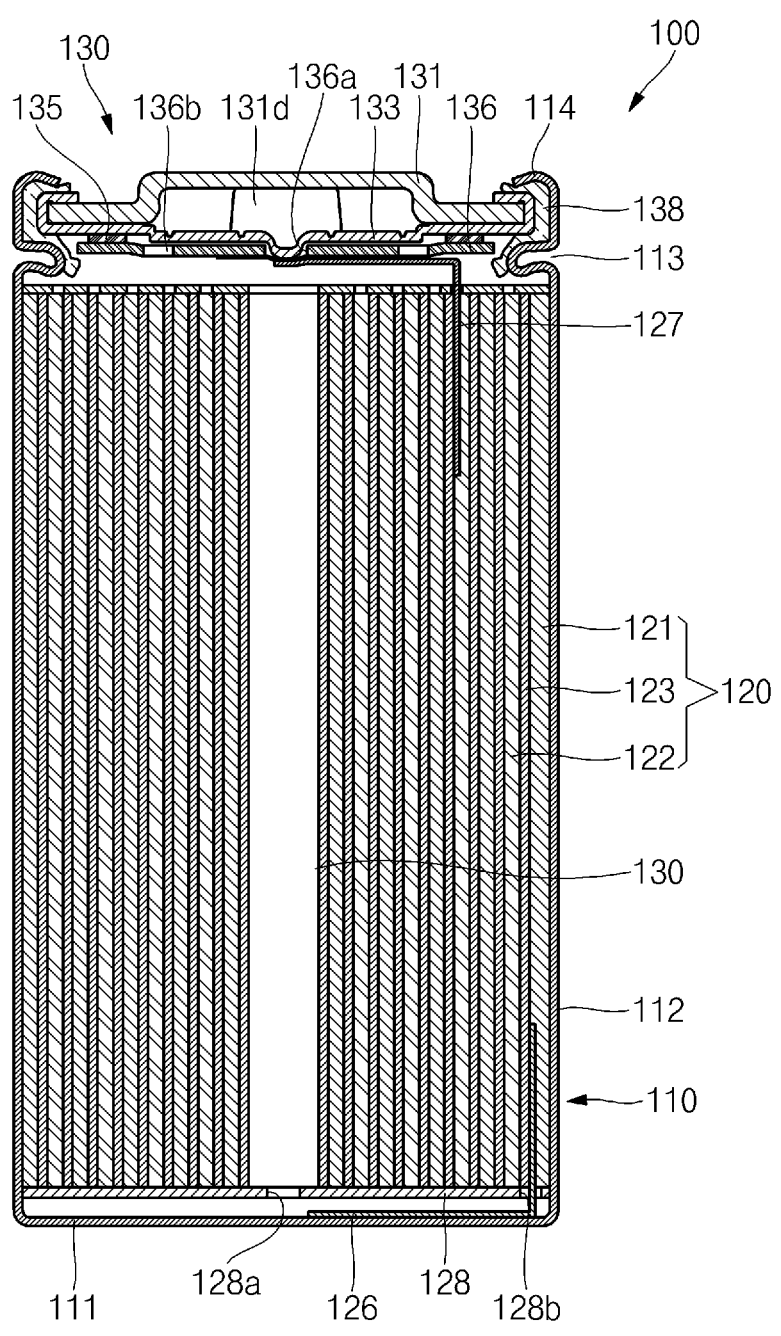

As shown in FIGS. 1A, 1B and 1C, the secondary battery 100 according to the present invention includes a case 110, an electrode assembly 120 received in the case 110, and a cap assembly 130 sealing a top-end opening of the case 110.

The case 110 includes a circular bottom portion 111 and a side portion 112 extending in an upper direction from the bottom portion 111 by a predetermined length. Here, the secondary battery 100 may be a cylindrical secondary battery formed by winding the electrode assembly 120 in the form of a jelly roll. During the manufacturing process of the secondary battery 100, the upper portion of the case 110 is opened. Therefore, during the assembling process of the secondary battery, the electrode assembly 120 may be inserted into the case 110 together with an electrolyte. The case 110 may be formed of steel, a steel alloy, aluminum, an aluminum alloy, or an equivalent thereof, but the material thereof is not limited thereto. In addition, the case 110 may have a beading part 113 that is inwardly recessed at a lower portion of the cap assembly 130 so as to prevent the electrode assembly 120 from being separated to the outside, and a crimping part 114 that is inwardly bent at an upper portion of the cap assembly 130.

The electrode assembly 120 is received in the case 110 together with an electrolyte. Here, the electrolyte may include a non-aqueous organic electrolytic solution that is a mixture of a lithium salt, such as $LiPF6$, $LiBF4$, or $LiClO4$, and a high-purity organic solvent, as an organic liquid containing a salt injected to allow lithium ions to move between the cathode plate and the anode plate, which constitute the electrode assembly 120, but the present invention is not limited thereto.

The electrode assembly 120 includes an anode plate 121 coated with an anode active material, a cathode plate 122 coated with a cathode active material, and a separator 125 interposed between the anode plate 121 and the cathode plate 122 to prevent a short between the anode plate 121 and the cathode plate 122 and to allow only lithium ions to move. The anode plate 121, the cathode plate 122, and the separator 125 are wound in a substantially cylindrical shape. In addition, an anode tab 126 that protrudes downward by a predetermined length may be attached to the anode plate 121, and a cathode tab 127 that protrudes upward by a predetermined length may be attached to the cathode plate 122, but vice versa.

Figure 2A:
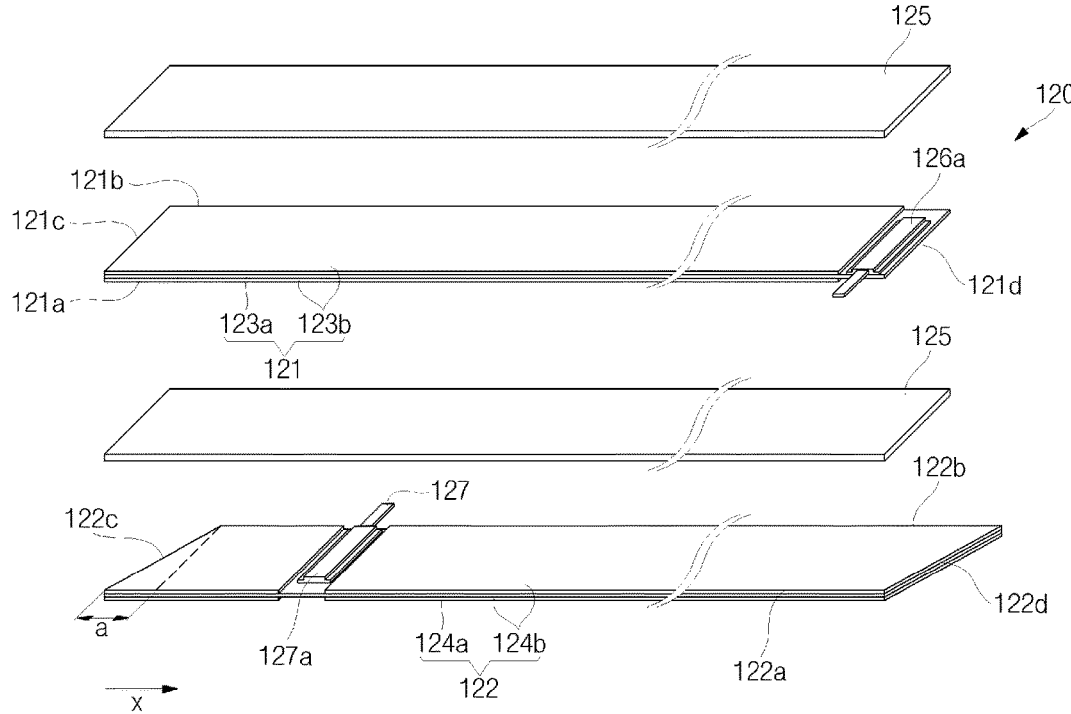
FIGS. 2A and 2B are an exploded perspective view and a partially enlarged plan view illustrating an example before the electrode assembly of the secondary battery shown in FIGS. 1A to 1C is wound.
Figure 2B:
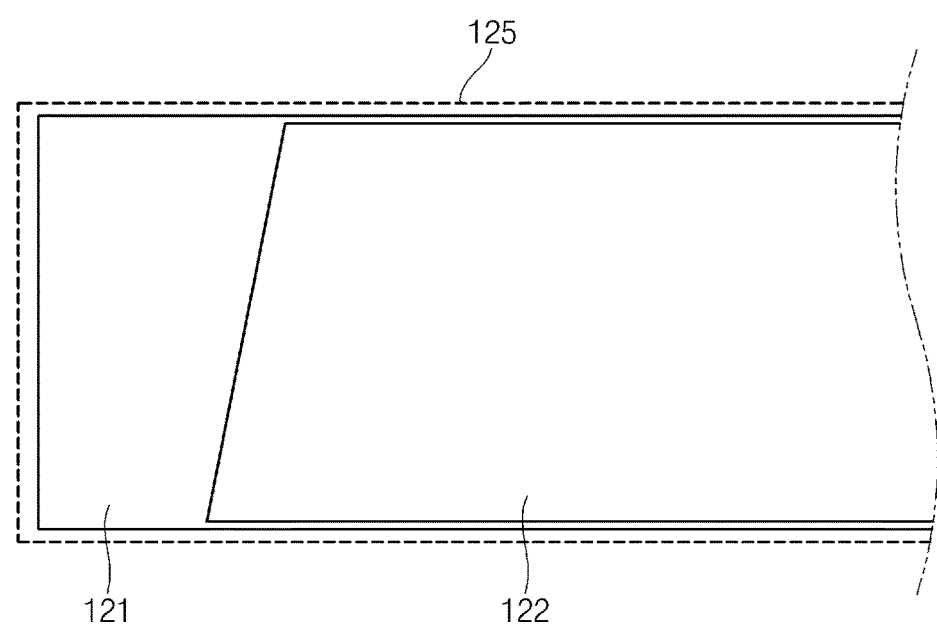

Additionally, referring to FIGS. 2A and 2B, an exploded perspective view and a partially enlarged plan view before the electrode assembly of the secondary battery shown in FIGS. 1A to 1C is wound are shown. Here, FIG. 2B is an enlarged plan view of a predetermined region of the winding tip in a plan view in which the anode plate 121 and the cathode plate 122 are stacked before the electrode assembly 120 is wound. Of course, the separator 125 is interposed between the anode plate 121 and the cathode plate 122, and the separator 125 is indicated by a dotted line to make the relationship between the cathode plate 122 and the anode plate 121 more clear. Hereinafter, the configuration of the secondary battery and the electrode assembly of the present invention will be described in detail with reference to FIGS. 2A and 2B.

First, in the anode plate 121 of the electrode assembly 120, an anode coating layer 123b that is an active material made of a transition metal oxide is coated on both surfaces of an anode current collector plate 123a that is a plate-shaped metal foil made of copper (Cu) or nickel (Ni). The anode plate 121 may be shaped of a rectangular plate extending along the longitudinal direction (x). Here, the longitudinal direction (x) refers to a direction in which the anode plate 121, the cathode plate 122, and the separator 125 extend before the electrode assembly 120 is wound. The anode plate 121 may include one side 121a extending along the longitudinal direction (x), and a side 121b, a side opposite to the side. In addition, the anode plate 121 may further include a leading side 121c connecting the one side 121a and the opposite side 121b, and a terminating side 121d. The leading side 121c and the terminating side 121d of the anode plate 121 may be perpendicular from the side 121a and the opposite side 121b. That is, the anode plate 121 may be a rectangular plate. Here, the leading side 121c may be located in the center winding portion of the wound electrode assembly 120, and the terminating side 121d may be located at the outermost portion of the wound electrode assembly 120.

In addition, the anode tab 126 may be attached to any one of the first surface of the anode current collector plate 123a and the second surface opposite to the first surface. In addition, the anode tab 126 may protrude a predetermined length from the one side 121a in the longitudinal direction (x) of the anode current collector plate 123a to be extended. The anode tab 126 may protrude and extend substantially in the vertical direction from one side 121a in the longitudinal direction (x) of the anode current collector plate 123a. Here, the anode tab 126 may be attached to the uncoated portion on which the anode coating layer 123b is not coated in the anode current collector plate 123a. Preferably, the anode tab 126 may be attached to a region adjacent to the terminating side 121d of the anode current collector plate 123a. Of course, in the anode current collector plate 123a, an uncoated region on which the anode coating layer 123b is not coated may be provided in a region adjacent to the terminating side 121d. However, in the present invention, the position to which the anode tab 126 is attached may vary in various manners, and the present invention is not limited thereto.

Additionally, an insulating tape 126a may be further provided to cover the anode tab 126 attached to the anode current collector plate 123a. The insulating tape 126a may be attached to the anode current collector plate 123a to cover a portion of the anode tab 126, which is attached to the anode current collector plate 123a. Here, a portion of the anode tab 126 that protrudes downwardly from a lower portion of the electrode assembly 120 by a predetermined length may be exposed to the outside of the insulating tape 126a. In addition, the insulating tape 126a may be attached to cover a portion of the anode current collector plate 123a adjacent to the anode tab 126 in the longitudinal direction (x). The anode tab 126 may be made of copper or nickel, but the present invention is not limited thereto.

The cathode plate 122 may have a cathode coating layer 124b, which is an active material made of a transition metal oxide, coated on both sides of a cathode current collector plate 124a which is a plate-shaped metal foil made of aluminum (Al). The cathode plate 122 may be shaped of a rectangular plate extending along the longitudinal direction (x). The cathode plate 122 may include a side 122a extending along the longitudinal direction (x), and a side 122b that is a side opposite to the side 122a. In addition, the cathode plate 122 may further include a leading side 122c connecting the side 122a and the opposite side 122b, and a terminating side 122d. The side 122a and the opposite side 122b of the cathode plate 122 may be parallel to the side 121a and the opposite side 121b of the anode plate 121. In addition, as shown in FIG. 2B, the leading side 122c of the cathode plate 122 may be shorter than the leading side 121c of the anode plate 121 in the longitudinal direction (x) at the center winding portion of the electrode assembly 120. That is, the leading side 121c of the anode plate 121 may extend longer toward the center winding portion than the leading side 122c of the cathode plate 122.

The leading side 122c of the cathode plate 122 may be slanted to have an acute or obtuse angle with a side 122a. Although the leading side 122c in FIG. 2A is illustrated as slanted at an acute angle from the side 122a, it may be slanted at an obtuse angle. The leading side 122c of the cathode plate 122 may be located in the leading-end region (a). The leading-end region (a) may be a predetermined region from the center winding portion of the electrode assembly 12. Here, in the leading-end region (a), the cathode plate 122 may have a right-angled triangular shape, and the leading side 122c may be a hypotenuse. Here, since the leading side 122c positioned in the leading-end region (a) is formed to have a slanted surface, stress generated during charging and discharging of the secondary battery 100 can be dispersed.

Figure 3A:
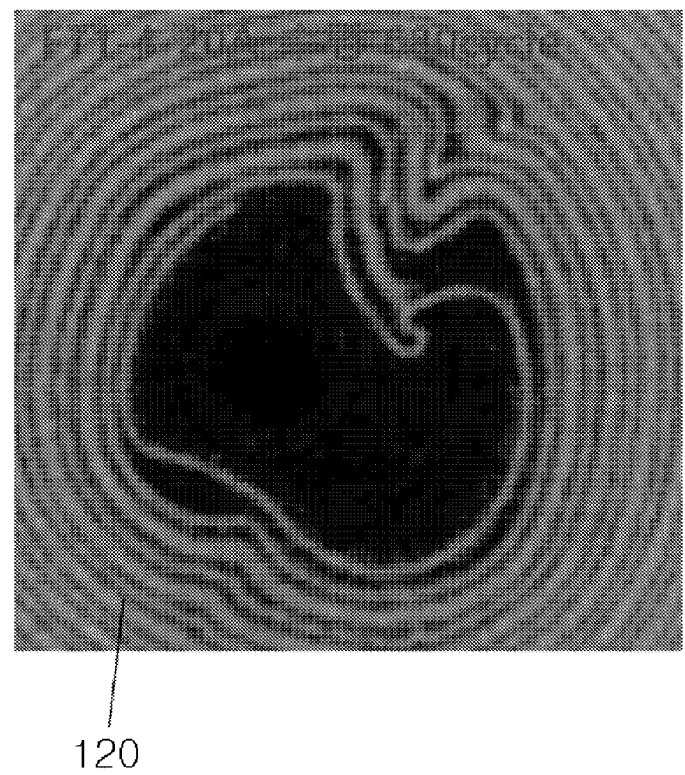
FIGS. 3A and 3B are enlarged perspective views illustrating an example of distortion occurring at a center winding portion of an electrode assembly and a separator and a cathode plate in FIG. 3A.
Figure 3B:
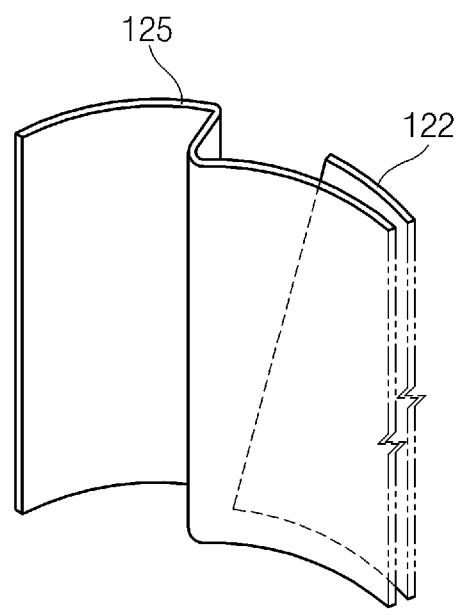

As an example, FIGS. 3A and 3B show: an example in which, as the secondary battery 100 is repeatedly charged and discharged, deformation occurs due to an increase in stress in the center winding portion of the electrode assembly 120; and the separator 125 and the cathode plate 122 of the center winding portion of the deformed electrode assembly 120. Here, the electrode assembly 120 may generate a Z-deformation bent by compressive stress in the center winding portion substantially parallel to the winding axis. In the electrode assembly 120, when the leading side 122c is perpendicular to the side 122a, stress may be concentrated on the deformed portion, so that the cathode plate 122 passes through the separator 125, and a short with the anode plate 121 may occur. That is, since the cathode plate 122 of the secondary battery 100 has a slanted surface in which the leading side 122c located in the leading-end region (a) is slanted, the stress generated during charging and discharging of the secondary battery 100 may be dispersed, thereby preventing a short due to deformation.

Figure 4A:
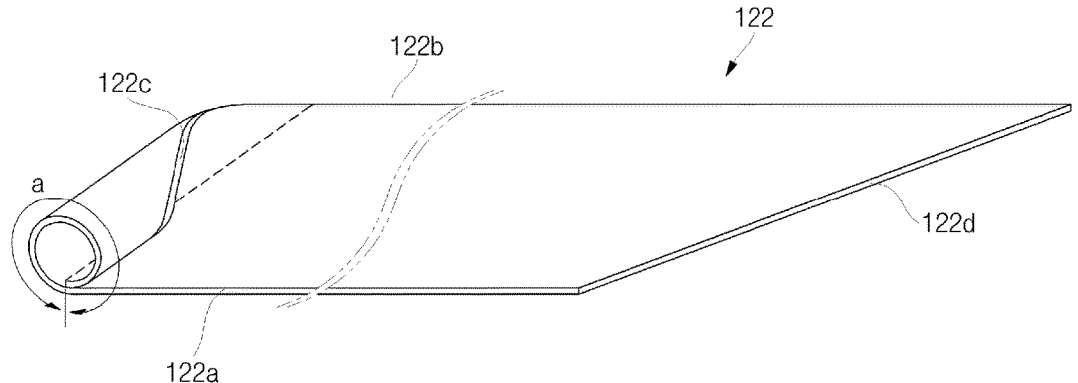
FIGS. 4A and 4B are perspective views illustrating an example in which a leading-end region of a cathode plate is wound by 1 turn, and an example in which a leading-end region of a cathode plate is wound by ¼ turn.
Figure 4B:
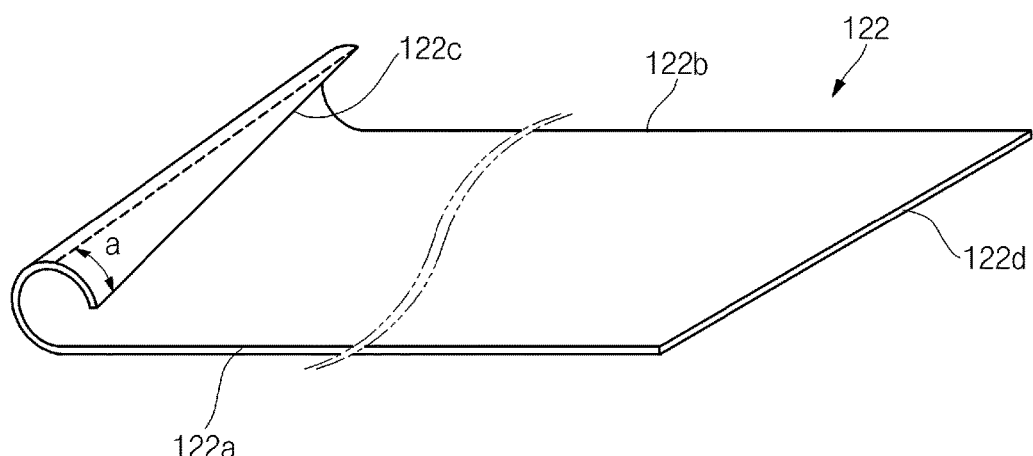

The leading-end region (a) may be located in the center winding portion when being wound in a cylindrical shape in a state in which the anode plate 121, the separator 125, the cathode plate 122, and the separator 125 are stacked. The leading-end region (a) may be wound by any one selected from among ¼ turn to 1 turn when the electrode assembly 120 is wound in a cylindrical shape. The leading-end region (a) may be wound by any one selected from among ¼ turn to 1 turn when the electrode assembly 120 is wound in a cylindrical shape. Here, when the leading-end region (a) is smaller than ¼ turn, it may be difficult to disperse the stress generated during charging and discharging, and when the leading-end region (a) is larger than 1 turn, the capacity of the electrode assembly 120 may be reduced. As an example, FIG. 4A shows the cathode plate 122 having the leading-end region (a) wound by 1 turn, and FIG. 4B shows the cathode plate 122 having the leading-end region (a) wound by ¼ turn. That is, as shown in FIGS. 4A and 4B, since the cathode plate 122 has the slanted leading side 122c in the leading-end region (a), even if deformation occurs in the center winding portion due to charging and discharging of the secondary battery 100, stress can be dispersed, thereby preventing a short with the anode plate 121.

In addition, the terminating side 122d of the cathode plate 122 may be parallel to the leading side 122c. That is, the cathode plate 122 may be a parallelogram plate. Here, when manufacturing the cathode plate 122, by cutting the leading side 122c so as to have a slanted surface in a roll-type cathode plate, the terminating side 122d may be naturally formed to have a shape corresponding to the leading side 122c. However, the shape of the terminating side 122d may vary in various manners according to additional cutting processing. As an example, the terminating side 122d may be perpendicular to the side 122a.

Here, the leading side 122c may be located at the center winding portion of the wound electrode assembly 120, and the terminating side 122d may be located at the outermost portion of the wound electrode assembly 120.

In addition, the cathode tab 127 may be attached to any one of a first surface of the cathode current collector plate 124a and a second surface opposite to the first surface. In addition, the cathode tab 127 may protrude a predetermined length from the opposite side 122b in the longitudinal direction (x) of the cathode current collector plate 124a, and may extend. The cathode tab 127 may protrude and extend substantially vertically from the opposite side 122b in the longitudinal direction (x) of the cathode current collector plate 124a. Here, the cathode tab 127 may protrude toward the opposite side of the side 121a from which the anode tab 126 protrudes. The cathode tab 127 may be attached to the uncoated portion of the cathode current collector plate 124a on which the cathode coating layer 124b is not coated. Preferably, the cathode tab 127 may be attached to a predetermined region spaced a predetermined distance apart from the leading side 122c in the longitudinal direction (x) of the cathode current collector plate 124a. Of course, in the cathode current collector plate 124a, an uncoated portion on which the cathode coating layer 124b is not coated may be provided in a predetermined region spaced a predetermined distance apart from the leading side 122c. However, the position to which the cathode tab 127 is attached may vary in various manners, and the present invention is not limited thereto.

Additionally, an insulating tape 127a may be further provided to cover the cathode tab 127 attached to the cathode current collector plate 124a. The insulating tape 127a may be attached to the cathode current collector plate 124a to cover a portion of the cathode tab 127 attached to the cathode current collector plate 124a. Here, a portion of the cathode tab 127 protruding from the upper portion of the electrode assembly 120 by a predetermined length may be exposed to the outside of the insulating tape 127a. Also, the insulating tape 127a may be attached to cover a portion of the cathode current collector plate 124a adjacent to the cathode tab 127 in the longitudinal direction (x). The cathode tab 127 may be made of an aluminum material, but the present invention is not limited thereto.

In addition, the anode tab 126 and the cathode tab 127 may be positioned on the same surface of the wound anode and cathode plates 121 and 122, or may be positioned on opposite surfaces of the anode plate 121 and the cathode plate 122. Here, the same surface may be a surface facing the center winding portion in the wound electrode assembly 120 in the same manner, or may be a surface facing the outermost portion in the same manner.

In addition, the anode tab 126 of the electrode assembly 120 may be welded to the bottom portion 111 of the case 110. Accordingly, the case 110 may operate as an anode. Of course, on the contrary, the cathode tab 127 may also be welded to the bottom portion 111 of the case 110, and in this case, the case 110 may operate as a cathode.

Additionally, an insulation plate 128 that is coupled to the case 110 and has a first hole 128a in the center and a second hole 128b on the outside thereof may be interposed between the electrode assembly 120 and the bottom portion 111. The insulation plate 128 serves to prevent the electrode assembly 120 from electrically contacting the bottom portion 111 of the case 110. In particular, the insulation plate 128 serves to prevent the cathode plate 122 of the electrode assembly 120 from electrically contacting the bottom portion 111. Here, the first hole 128a serves to allow the gas to quickly move upward when a large amount of gas is generated due to abnormality of secondary battery, and the second hole 128b serves to allow the anode tab 126 to penetrate therethrough to then be welded to the bottom portion 111. Additionally, the electrode assembly 120 further includes a center pin (not shown) provided in the form of a hollow circular pipe in the substantially center, thereby allowing a large amount of gas generated due to abnormality of secondary battery to be easily discharged through the inner passage of the center pin.

In addition, a second insulating plate 129 that is coupled to the case 110 and has a first hole 129a in the center and a plurality of second holes 129b on the outside thereof may be interposed between the electrode assembly 120 and the cap assembly 130. The second insulating plate 129 serves to prevent the electrode assembly 120 from electrically contacting the cap assembly 130. In particular, the second insulating plate 129 serves to prevent the anode plate 121 of the electrode assembly 120 from electrically contacting the cap assembly 130. Here, the first hole 129a serves to allow the gas to quickly move toward the cap assembly 130 when a large amount of gas is generated due to abnormality of secondary battery, and the second hole 129b serves to allow the cathode tab 127 to penetrate therethrough to then be welded to the cap assembly 130. In addition, the remaining second hole 129b serves to allow the electrolyte to quickly flow into the electrode assembly 120 during the electrolyte injection process. The electrolyte serves as a movement medium for lithium ions generated by electrochemical reactions in the cathode plate and anode plate inside the battery during charging and discharging.

The cap assembly 130 includes a cap-up 131 having a plurality of through-holes 131d, a safety plate 133 installed under the cap-up 131, a connecting ring 135 installed under the safety plate 133, a cap-down 136 coupled to the connecting ring 135 and having first and second through-holes 136a and 136b formed therein, a sub-plate 137 fixed to a lower portion of the cap down 136 and electrically connected to the cathode tab 127, and an insulating gasket 138 that insulates the cap up 131, the safety plate 133, the connecting ring 135, and the cap down 136 from the side portion 112 of the case 110.

Here, the insulating gasket 138 is configured to be substantially compressed between a beading part 113 and a crimping part 114 formed on the side portion 112 of the case 110. In addition, a through-hole 131d formed in the cap up 131 and a through-hole 136b formed in the cap down 136 may serve to discharge the internal gas to the outside when an abnormal internal pressure occurs inside the case 110. Of course, the safety plate 133 is electrically separated from the sub-plate 137 while being inverted upward due to the internal pressure, and is then ruptured, and the internal gas is released to the outside.

Figure 5:
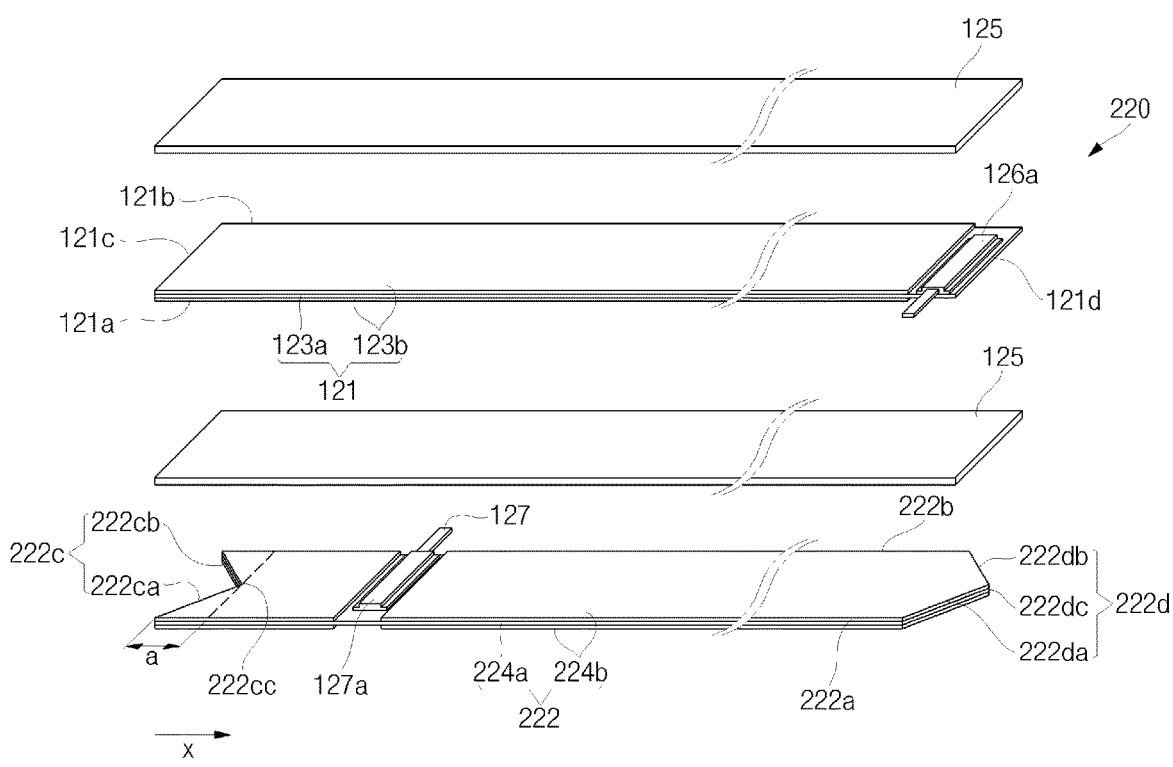
FIG. 5 is an exploded perspective view illustrating another example before the electrode assembly of the secondary battery shown in FIGS. 1A to 1C is wound.

Referring to FIG. 5, an exploded perspective view showing another example before the electrode assembly of the secondary battery shown in FIGS. 1A to 1C is wound is shown. As shown in FIG. 5, the electrode assembly 220 includes an anode plate 121 in which an anode active material 123*b* is coated on an anode current collector plate 123*a*, a cathode plate 222 in which a cathode active material 224*b* is coated on a cathode current collector plate 224*a*, and a separator 125 that is interposed between the anode plate 121 and the cathode plate 222 to prevent a short circuit between the anode plate 121 and the cathode plate 222 and to enable only the movement of lithium ions.

The anode plate 121 and the separator 125 of the electrode assembly 220 are the same as those of the electrode assembly 120 shown in FIGS. 2A and 2B. Therefore, the following description will focus on the cathode plate 222 of the electrode assembly 220, which is different from the cathode plate of the electrode assembly 120.

The cathode plate 222 has a cathode coating layer 224*b*, which is an active material made of transition metal oxide, coated on both sides of a cathode current collector plate 224*a*, which is a plate-shaped metal foil made of aluminum (Al). The cathode plate 222 may be shaped of a plate extending along the longitudinal direction (x). The cathode plate 222 may include a side 222*a* extending along the longitudinal direction (x) and a side 222*b*, as a side opposite to the side. In addition, the cathode plate 222 may further include a leading side 222*c* connecting the side 222*a* and the opposite side 222*b*, and a terminating side 222*d*. The side 222*a* and the opposite side 222*b* of the cathode plate 222 may be parallel to the side 121*a* and the opposite side 121*b* of the anode plate 121. In addition, the leading side 222*c* of the cathode plate 222 may be shorter than the leading side 121*c* of the anode plate 121 in the longitudinal direction (x) in the center winding portion of the electrode assembly 220. That is, the leading side 121*c* of the anode plate 121 may extend longer in the center winding portion direction than the leading side 222*c* of the cathode plate 222.

The leading side 222*c* of the cathode plate 222 may include a first leading side 222*ca* slanted to have an acute or obtuse angle with respect to the side 222*a* and a second leading side 222*cb* slanted to have an acute or obtuse angle with respect to the opposite side 222*b*. Here, the first leading side 222*ca* may be connected to the end of the side 222*a*, and the second leading side 222*cb* may be connected to the end of the opposite side 222*b*.

Here, when the first leading side 222*ca* has an acute angle with respect to the side 222*a*, the second leading side 222*cb* may have an acute angle with respect to the opposite side 222*b*. Of course, when the first leading side 222*ca* has an obtuse angle with respect to the side 222*a*, the second leading side 222*cb* may have an obtuse angle with respect to the opposite side 222*b*. For example, the angle between the first leading side 222*ca* and the side 222*a* and the angle between the second leading side 222*cb* and the opposite side 222*b* may be the same with each other.

In addition, the end of the first leading side 222*ca* is connected to the end of the second leading side 222*cb*. That is, the leading side 222*c* may have a bent portion 222*cc* at a portion where the first leading side 222*ca* and the second leading side 222*cb* are connected. Preferably, the length of the first leading side 222*ca* and the second leading side 222*cb* may be the same with each other, and the bent portion 222*cc* may be located at the center of the leading side 222*c*.

However, the lengths of the first leading side 222*ca* and the second leading side 222*cb* are not limited in the present invention.

The leading side 222*c* of the cathode plate 222 may be located in the front end region (a). Here, in the leading-end region (a), the cathode plate 222 may be shaped to have two right-angled triangles, and the first leading side 222*ca* and the second leading side 222*cb* may be hypotenuses of the two right-angled triangles, respectively. Here, by the two first leading side 222*ca* and the second leading side 222*cb* slanted with respect to the side 222*a* and the opposite side 222*b* located in the leading-end region (a), stress can be dispersed during charging and discharging of the secondary battery 100.

In the electrode assembly 220, when the leading side 222*c* is perpendicular to the side 222*a* and the opposite side 222*b*, the stress may be concentrated on the deformed portion, so that the cathode plate 222 penetrates through the separator 125 to cause a short with the anode plate 121. That is, since the cathode plate 222 of the secondary battery 100 has a slanted surface in which the first leading side 222*ca* and the second leading side 222*cb* positioned in the leading-end region (a) are slanted, a short occurring due to deformation may be prevented by dispersing the stress applied to the deformed portion during charging and discharging of the secondary battery 100.

The leading-end region (a) may be located in the center winding portion when being wound in a cylindrical shape in a state in which the anode plate 121, the separator 125, the cathode plate 222, and the separator 125 are stacked. The leading-end region (a) may be wound by any one selected from among ¼ turn to 1 turn when the electrode assembly 220 is wound in a cylindrical shape. Here, when the leading-end region (a) is smaller than ¼ turn, it may be difficult to disperse the stress generated during charging and discharging, and when the leading-end region (a) is larger than 1 turn, the capacity of the electrode assembly 220 may be reduced.

In addition, the terminating side 222*d* of the cathode plate 222 may be shaped to correspond to the leading side 222*c*. As shown in FIG. 5, in the leading-end region (a), when the first leading side 222*ca* has an acute angle with respect to the side 222*a*, and the second leading side 222*cb* has an acute angle with respect to the opposite side 222*b*, the first terminating side 222*da* may have an obtuse angle with respect to the side 222*a*, and the second terminating side 222*db* may have an obtuse angle with respect to the opposite side 222*b*, in the terminating side 222*d*. Of course, on the contrary, the leading side 222*c* may have the shape of the terminating side 222*d* of FIG. 5 , and the terminating side 222*d* may have the shape of the leading side 222*c* of FIG. 5.

In addition, the first terminating side 222*da* may be connected to the side 222*a*, and the second terminating side 222*db* may be connected to the opposite side 222*b*. In addition, a bent portion 222*dc* may be provided at a portion where the first terminating side 222*da* and the second terminating side 222*db* are connected. Preferably, the length of the first terminating side 222*da* and the second terminating side 222*db* may be the same with each other, and the bent portion 222*dc* may be located at the center of the terminating side 222*d*. However, the lengths of the first terminating side 222*da* and the second terminating side 222*db* are not limited in the present invention.

Here, when manufacturing the cathode plate 222, the terminating side 222*d* may be naturally formed to have a shape corresponding thereto, by cutting the leading side 222*c* so as to have a first leading side 222*ca*, a second leading side 222cb, and a bent portion 222cc in a roll-type cathode plate. However, the shape of the terminating side 222d may vary in various manners according to additional cutting processing.

Here, the leading side 222c may be located at the center winding portion of the wound electrode assembly 220, and the terminating side 222d may be located at the outermost portion of the wound electrode assembly 220.

In addition, the cathode tab 127 may be attached to any one of a first surface of the cathode current collector plate 224a and a second surface opposite to the first surface. In addition, the cathode tab 127 may protrude a predetermined length from the opposite side 222b in the longitudinal direction (x) of the cathode current collector plate 224a, and may extend. The cathode tab 127 may protrude and extend substantially vertically from the opposite side 222b in the longitudinal direction (x) of the cathode current collector plate 224a. Here, the cathode tab 127 may protrude toward the opposite side of the side 121a from which the anode tab 126 protrudes. The cathode tab 127 may be attached to the uncoated portion of the cathode current collector plate 224a on which the cathode coating layer 224b is not coated. Preferably, the cathode tab 127 may be attached to a predetermined region spaced a predetermined distance apart from the leading side 222c in the longitudinal direction (x) of the cathode current collector plate 224a. Of course, in the cathode current collector plate 224a, an uncoated portion on which the cathode coating layer 224b is not coated may be provided in a predetermined region spaced a predetermined distance apart from the leading side 222c. However, the position to which the cathode tab 127 is attached may vary in various manners, and the present invention is not limited thereto.

Additionally, an insulating tape 127a may be further provided to cover the cathode tab 127 attached to the cathode current collector plate 224a. The insulating tape 127a may be attached to the cathode current collector plate 224a to cover a portion of the cathode tab 127 attached to the cathode current collector plate 224a. Here, a portion of the cathode tab 127 protruding and extending upward by a predetermined length from the electrode assembly 220 may be exposed to the outside of the insulating tape 127a. Also, the insulating tape 127a may be attached to cover a portion of the cathode current collector plate 224a adjacent to the cathode tab 127 in the longitudinal direction (x). The cathode tab 127 may be made of an aluminum material, but the present invention is not limited thereto.

In addition, the anode tab 126 and the cathode tab 127 may be positioned on the same surface of the wound anode and cathode plates 121 and 222, or may be positioned on opposite surfaces of the anode plate 121 and the cathode plate 222. Here, the same surface may be a surface facing the center winding portion in the wound electrode assembly 220 in the same manner, or may be a surface facing the outermost portion in the same manner.

In addition, the anode tab 126 of the electrode assembly 220 may be welded to the bottom portion 111 of the case 110. Accordingly, the case 110 may operate as an anode. Of course, on the contrary, the cathode tab 127 may also be welded to the bottom portion 111 of the case 110, and in this case, the case 110 may operate as a cathode.

What has been described above is only one embodiment for implementing an electrode assembly and a secondary battery comprising same, according to the present invention, but the present invention is not limited to the aforementioned embodiment. Rather, it will be understood that the technical spirit of the present invention exists to the extent that a person skilled in the art in the field to which the present invention belongs could implement various modifications, without departing from the gist of the present invention, as claimed in the following claims.

INDUSTRIAL APPLICABILITY

The present invention can be applied to fields of an electrode assembly and a secondary battery comprising same, and industrial fields, such as automobiles having secondary batteries mounted therein, etc.

The invention claimed is:
1. An electrode assembly, comprising:
   an anode plate having an anode coating layer formed on an anode current collector plate, the anode plate having a rectangular shape;
   a cathode plate having a cathode coating layer formed on a cathode current collector plate; and
   a separator interposed between the cathode plate and the anode plate, the electrode assembly being formed by winding a stack of the anode plate, the separator, and the cathode plate into a wound electrode assembly,
   wherein the cathode plate comprises:
      a side extending along a lengthwise direction;
      an opposite side opposite to the side, the opposite side extending along the lengthwise direction;
      a leading side directly connecting the side and the opposite side and located at a center winding portion of the wound electrode assembly, an entirety of the leading side being slanted in a same direction to have an acute angle or obtuse angle with respect to the side, and the cathode coating layer extending to the leading side to contact the leading side; and
      a terminating side connecting the side and the opposite side and located, as a side opposite to the leading side, on an outermost side of the wound electrode assembly.

2. The electrode assembly of claim 1, wherein the leading side is located in a leading-end region, the cathode plate is a right-angled triangle in the leading-end region, and the leading side is an oblique side of the right-angled triangle.

3. The electrode assembly of claim 2, wherein the leading-end region is wound by any one of ¼ to 1 turn when the electrode assembly is wound in a cylindrical shape.

4. The electrode assembly of claim 1, wherein the terminating side is parallel to the leading side, so that the cathode plate is a parallelogram plate.

5. The electrode assembly of claim 1, wherein the anode plate is a rectangular plate and has a side and an opposite side, extending along the lengthwise direction and parallel to the side of the cathode plate, a leading side connecting the side of the anode plate and the opposite side of the anode plate and located at the center winding portion of the wound electrode assembly, and a terminating side connecting the side and the opposite side of the anode plate and located, as a side opposite to the leading side of the anode plate, on the outermost side of the wound electrode assembly.

6. The electrode assembly of claim 5, wherein the leading side of the anode plate extends longer toward the center winding portion along the longitudinal direction than the leading side of the cathode plate.

7. A secondary battery, comprising:
   the wound electrode assembly as claimed in claim 1;
   a case having an internal space, wherein the wound electrode assembly and an electrolyte are accommodated in the inner space; and

a cap plate that is coupled to an upper portion of the case
    to seal the case.
  8. The electrode assembly of claim 1, wherein an edge of
the separator extends beyond the leading side of the cathode
plate in the center winding portion of the wound electrode
assembly.
  9. The electrode assembly of claim 1, further comprising
a cathode tab protruding perpendicularly from the cathode
current collector, the cathode tab being spaced apart from the
leading side along a longitudinal direction of the cathode
current collector, and the cathode tab being separated from
the leading side by a portion of the cathode coating layer.

<center>* * * * *</center>